United States Patent [19]

Smith

[11] Patent Number: 4,484,646
[45] Date of Patent: Nov. 27, 1984

[54] RECREATIONAL VEHICLE

[76] Inventor: Billy J. Smith, 13727 Bonaventure, Houston, Tex. 77065

[21] Appl. No.: 440,361

[22] Filed: Nov. 9, 1982

[51] Int. Cl.³ .................... B62D 11/08; B62D 61/12
[52] U.S. Cl. .................................. 180/6.2; 180/6.6; 180/21; 192/13 R; 192/89 A; 280/211; 446/443
[58] Field of Search ............... 180/6.2, 6.24, 6.26, 180/6.32, 6.34, 6.36, 6.38, 6.4, 6.6, 6.62, 6.64, 21.23, 24.01; 280/274, 275, 276, 282, 1.1 R, 1.11 R, 211, 87.2; 192/13 R, 89 A; 46/202

[56] References Cited

U.S. PATENT DOCUMENTS

| 880,823 | 3/1908 | Redfield | 180/6.2 |
| 991,485 | 5/1911 | Darrow | 180/209 |
| 1,437,412 | 12/1922 | Girling | 192/89 A |
| 2,520,835 | 8/1950 | England | 180/6.2 |
| 2,941,346 | 6/1960 | Perry | 56/10.5 |
| 3,166,141 | 1/1965 | Shields et al. | 180/6.2 X |
| 3,386,753 | 6/1968 | Quedreux | 280/211 X |
| 3,700,059 | 10/1972 | Sutton | 180/209 |
| 3,712,397 | 1/1973 | Smith et al. | 180/6.2 |
| 3,820,790 | 6/1974 | Peterson | 273/129 R |
| 4,101,004 | 7/1978 | Oltman | 192/13 R X |
| 4,154,314 | 5/1979 | Tsuji et al. | 180/6.2 |
| 4,324,301 | 4/1982 | Eyerly | 180/2.1 |

FOREIGN PATENT DOCUMENTS

| 494280 | 10/1930 | Fed. Rep. of Germany | 180/6.2 |
| 818446 | 8/1959 | United Kingdom | 180/6.2 |

Primary Examiner—Joseph F. Peters, Jr.
Assistant Examiner—Mitchell J. Hill
Attorney, Agent, or Firm—Dodge & Bush

[57] ABSTRACT

A vehicle primarily intended for use as a recreational vehicle is disclosed having a pair of laterally spaced drive wheels and a pair of longitudinally spaced wheels mounted on the frame. A gasoline engine provides power to the drive wheels. Control levers are provided, one for each drive wheel, to simultaneously brake and disengage the drive power to one drive wheel. Two kinds of rotating vehicle motion is achieved. Rotation about a braked disengaged wheel occurs where the other wheel is not braked and fully engaged. Rotation about the vertical center-line of the vehicle occurs when one wheel is first braked, its power disengaged, and then its brake is released but its power remains disengaged where the other wheel is not braked and is fully engaged.

12 Claims, 6 Drawing Figures

RECREATIONAL VEHICLE

BACKGROUND OF THE INVENTION

1. Field of the Invention

This invention relates to a recreational vehicle and more particularly to a class of vehicles known as go carts.

2. Description of the Prior Art

Recreational vehicles such as go carts have traditionally been designed to simulate an ordinary passenger car motor vehicle. Such a vehicle has often included front and back wheels where a small horsepower gasoline engine drives the rear wheels and the vehicle is steered by means of a traditional steering wheel linking the front wheels. Such vehicles have been popular even though they operate much as a traditional vehicle and cannot be rotated rapidly for an exciting and thrilling yet safe ride.

Attempts have been made to provide recreational vehicles which will rotate or spin rapidly about a tight radius. One such vehicle is described in U.S. Pat. No. 4,324,301 issued to Eyerly intended for use as an amusement ride bumper car. The Eyerly bumper car has longitudinal wheels mounted on a frame and two drive wheels spaced laterally apart and driven by a pair of reversible variable speed hydrostatic transmissions coupled independently to the drive wheels. The electric motor for the vehicle is connected via a rectifier to a plurality of contacts mounted on the car for sliding engagement with floor plates of an amusement ride. Control levers on each side of the operator of the bumper car are moved forward or backward to cause the hydrostatic transmission of each wheel independently to turn in the forward or backward direction.

An object of the present invention is to provide a recreational vehicle which is capable of spinning motion and which may be used by individual owners or by amusement operators.

Another object of the invention is to provide a vehicle for substantially straight forward motion and spinning motion and is powered by a gasoline engine and is not confined to an electrified floor such as bumper cars have been provided.

It is another object of the invention to provide a recreational vehicle in which novel rotational effects are accomplished and in which a traditional steering wheel for steering a vehicle is obviated.

It is another object of this invention to provide a recreational vehicle which is inexpensive yet provides an unusual ride having two kinds of spinning action about either of its drive wheels.

It is another object of the invention to provide a means for simultaneously braking and disengaging the power to each of the two drive wheels of the vehicle.

It is still a further object of the invention to provide a novel clutch means by which each drive wheel is disengaged from the engine of the vehicle.

SUMMARY OF THE INVENTION

The invention is for a vehicle having a frame and a pair of laterally spaced drive wheels mounted on the frame and a pair of longitudinally spaced wheels also mounted on the frame. Drive means mounted on the frame and individually coupled to each wheel of the pair of drive wheels are provided for individually providing motive power to each drive wheel. Control means are additionally provided for individually and simultaneously braking of and disengaging the coupling of the drive means to each wheel of the pair of drive wheels.

According to the invention, the laterally spaced drive wheels are directly coupled to individual drive shafts and the drive means includes the power transfer means for individually providing rotative power to each shaft.

The power transfer means comprises a jack shaft mounted on the frame and coupled to a gasoline engine by means of a conventional centrifugal clutch. Power transfer from the jack shaft to the individual drive shafts is accomplished by means of first and second sprocket jack shaft assemblies. Drive chains are connected from the sprocket jack shaft assemblies to first and second drive shaft sprocket assemblies mounted on the respective drive shafts.

Control levers are provided for performing the simultaneous task of braking each of the respective drive wheels and disengaging the power coupling between the jack shaft and the drive wheel. For each drive wheel, braking is accomplished by means of a band about a drum mounted on the drive shaft. For each drive wheel power transfer means, the disengaging function is accomplished by means of a clutch assembly mounted on the end of the jack shaft for engaging and disengaging the jack shaft sprocket assembly from the jack shaft. Thus, actuation of each individual control lever simultaneously brakes its corresponding wheel and disengages coupling of power to that wheel.

The clutch assembly provided for each drive wheel power transfer means includes a clutch cone connected to the jack shaft and a clutch hub releasably engaging the clutch cone. The jack shaft sprocket assembly is secured to the clutch hub. A spring assembly is provided for urging the clutch hub into engagement with the clutch cone whereby the jack shaft sprocket assembly is rotatably coupled to the jack shaft. An actuating means responsive to a linkage from the control lever causes the spring assembly to cease urging the clutch hub into engagement with the clutch cone whereby the shaft sprocket assembly is decoupled from the jack shaft.

According to the invention the clutch hub, sprocket assembly and spring assembly fit about the jack shaft on bushings. The spring assembly includes a pillow block fixed with respect to the frame of the vehicle, a hub collar connected to the sprocket assembly and having a bearing surface for engagement with the actuating means, a thrust bearing connected to the hub collar and a spring held in compression between the thrust bearing and the pillow block. Until the hub collar causes further compression of the spring because of engagement by the actuating means, the spring forces the clutch hub into engagement with the clutch cone by transmitting its compressive force via the thrust bearing, hub collar and the sprocket assembly.

According to the invention, the actuating means includes a linkage for transferring longitudinal motion from the control arm into latitudinal motion for bearing against the hub collar thereby compressing the spring sufficiently to disengage the clutch hub from the clutch cone.

Advantageously, the vehicle according to the invention has each control lever and its associated brake linkage and clutch linkage arranged for: (a) simultaneous braking of the drive wheel and disengaging of the coupling of the drive means to the drive wheel from the jack shaft when the control lever is pulled relatively strongly, (b) no braking but disengaging of the coupling of the drive means to the drive wheel when the control lever is pulled relatively slightly and (c) no braking and engagement of the coupling of the drive means to the drive wheel when the control lever is not pulled. When a wheel is not braked and the power coupling of that wheel is made with the jack shaft thereby transmitting power to the wheel, that wheel tends to move in a straight line; however, simultaneous braking of the other wheel, and disengagement of the coupling of the drive means to the other wheel causes the vehicle to rotate about that other wheel. If there is no braking of the other wheel but there is disengagement of the coupling of the drive means to the drive wheel of the other wheel, the vehicle is caused to rotate about an axis approximately through the center of the vehicle. Thus, two kinds of rotation are provided by the linkages, brake systems and the clutch arrangements of the invention.

The longitudinally spaced wheels are preferably mounted for 360° rotation with respect to the frame. Advantageously a pair of longitudinally spaced wheels both at the front and rear of the vehicle provide for added agility of the vehicle. A seat and a foot throttle means are also provided with the vehicle.

BRIEF DESCRIPTION OF THE DRAWINGS

The foregoing summary of the invention and other objects and advantages of the invention will be described in more detail below taken in conjunction with the accompanying drawings of which.

DESCRIPTION OF THE INVENTION

Figure 1:
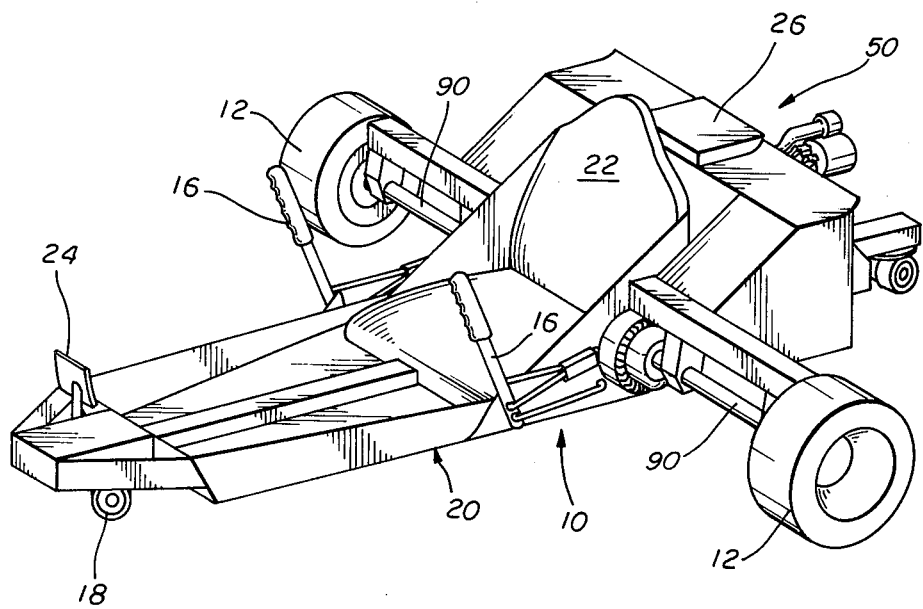
FIG. 1 is a perspective view of the vehicle according to the invention.

FIG. 1 illustrates the vehicle 10 according to the invention. The vehicle has latitudinally mounted drive wheels 12 having individual first and second drive shafts 90 and control levers 16, a separate lever being provided for braking and controlling the rotative power to each individual drive wheel 12. The vehicle has front and rear longitudinally mounted wheel means 18 which advantageously are mounted to the frame for 360° rotation. Preferably the front and rear wheel means each comprise two small diameter wheels circumferentially coated with hard surface material such as polyurethane. A body 20 is provided on which seat 22 is mounted. A foot throttle control 24 is linked to a gasoline engine 50 via linkage 86 and controls the level of power available for transmission to drive shafts 14.

Figure 2:
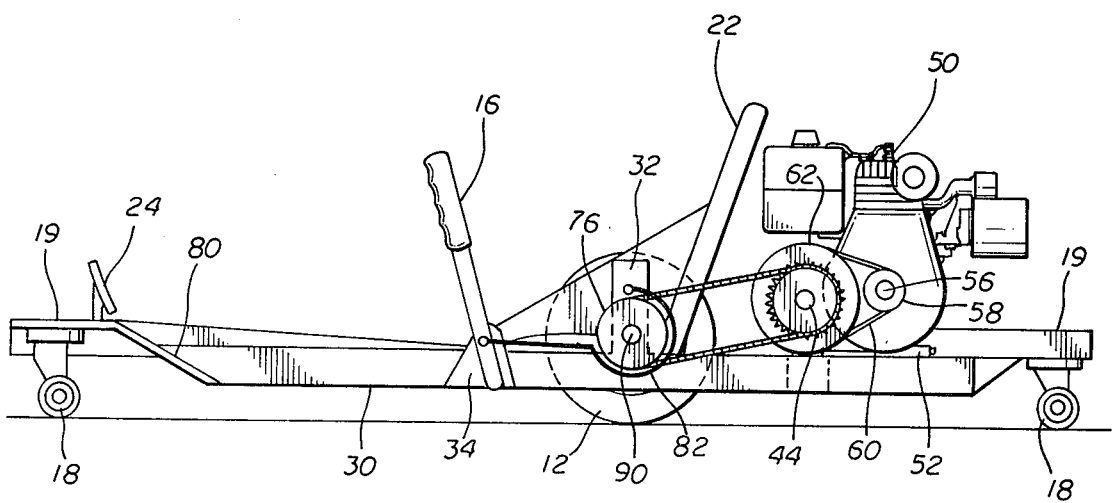
FIG. 2 is a partial cross-section and side view of the vehicle.
Figure 3:
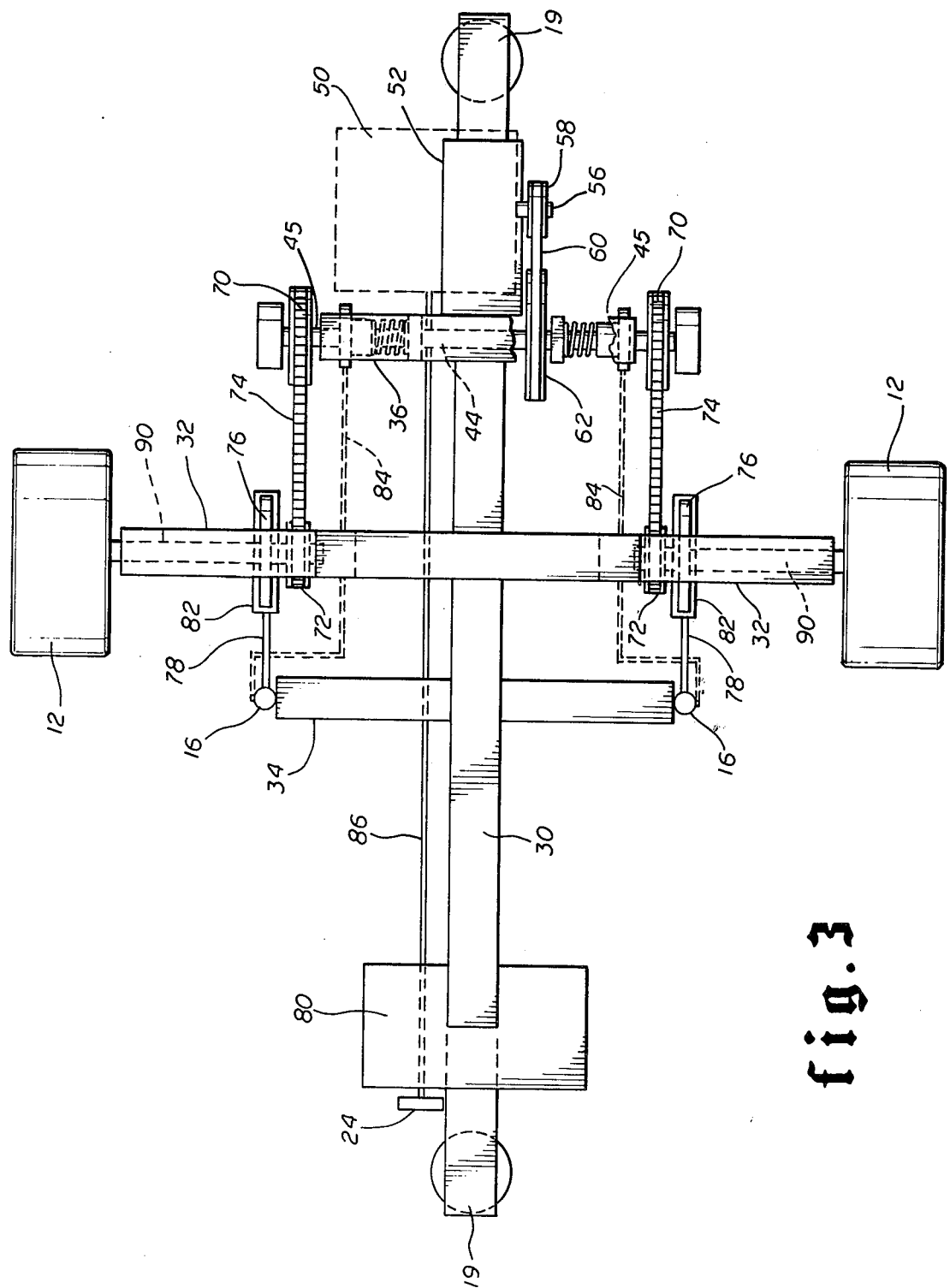
FIG. 3 is a top view showing the vehicle's frame, power transmission, braking and clutch arrangements
Figure 3A:
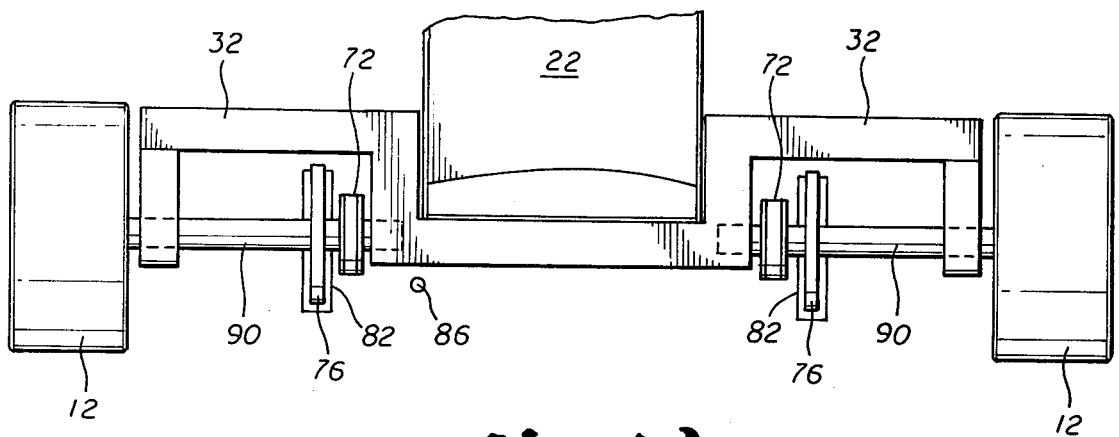
FIG. 3A is a rear view of the cross member of the frame of the vehicle.

Referring now to FIGS. 2 and 3, a longitudinal frame member 30 and a main latitudinal frame member 32 is provided. FIG. 3A illustrates that the latitudinal frame member 32 is "U" shaped having the bottom of its U secured to the longitudinal frame member 30. A second latitudinal member 34 is provided for mounting of the control levers 16 and a third latitudinal member 36 is provided for supporting jack shaft 44. A gasoline engine 50 is mounted on engine mounting plate 52.

An engine drive shaft 56 extends from the engine and drives a jack shaft 44 via centrifugal clutch 58 to which a drive means 60 such as a flexible belt or a drive chain is attached to a drive pulley or sprocket 62.

The centrifugal clutch 58 may be one similar to that sold in motorcycle and go cart supply houses under such trademarks as MAX-TORQUE, KOMET, MERCURY or AZUSA. A foot plate 80 is provided on which throttle control 82 is mounted. As best illustrated in FIG. 2, longitudinal wheel means 18 are mounted to the front and rear of the vehicle and are preferably each provided with two polyurethane wheels similar to skate wheels. Wheel means 18 are mounted advantageously for 360° rotation about mounting plates 19.

First and second drive shafts 90 are mounted with respect to latitudinal frame member 32. Advantageously the drive shafts 90 are fixed to drive wheels 12 causing the wheels to turn in direct rotation with drive shafts 90.

First and second clutch assemblies 45 are provided on each end of jack shaft 44 and each includes a sprocket 70 which provides power to drive shafts 90 via sprockets 72 and chains 74. Alternatively, pulleys and flexible belts may be substituted for sprockets 70 and 72 and chains 74. First and second brake assembly means are provided, one being provided for each drive shaft. Each brake assembly means includes a brake drum 76 mounted on each drive axle 90 and is controlled via a linkage 78 and brake band 82. Linkages 84 extend from first and second control levers 16 to clutch assembly 45 in order to control the engagement and disengagement of sprocket 70 to jack shaft 44. Linkage 86 extends from the throttle control pedal 24 to the throttle of the gasoline engine 50 and controls the level of power which is transmitted to the jack shaft 44 from the engine output shaft 56 and ultimately to the drive shafts 90.

Figure 4A:
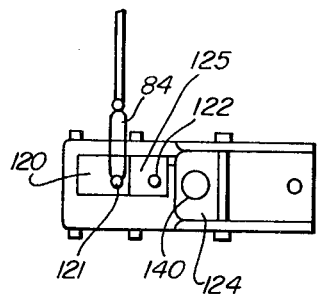
FIG. 4A illustrates in a plan view the mechanism whereby longitudinal movements of a clutch linkage are translated into lateral movements of a push plate and shaft activator.
Figure 4:
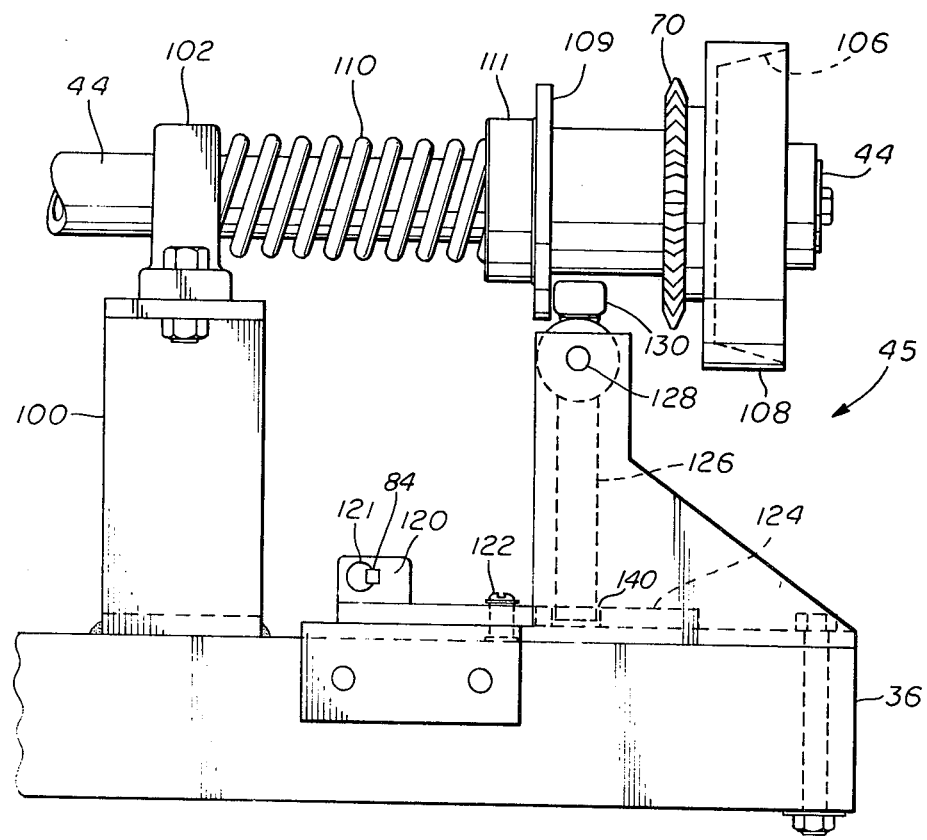
FIG. 4 illustrates the clutch arrangement whereby power is disengaged from the jack shaft to the drive wheel.

FIG. 4 shows the details of the clutch assembly 45 according to the invention. The clutch assembly is mounted on the rear latitudinal frame member 36 and provides a standoff 100 for mounting a pillow block 102 through which jack shaft 44 extends. A clutch cone 106 is fixed to the end of jack shaft 44 and may advantageously be keyed and set screwed directly to the jack shaft. A clutch hub 108 is mounted for free turning on bushings with respect to the jack shaft 44 and is mounted for engagement with clutch cone 106. The sprocket 70 is attached on one side to the clutch hub 108 and to its other side to hub collar 109, both the collar and the sprocket being mounted coaxially with the jack shaft 44 but not being connected to jack shaft 44 except when the hub 108 is engaged with the cone 106.

A spring 110 is connected between the pillow block 102 and thrust bearing 111 and provides a compressive force against the hub collar 109 and sprocket 70 causing the clutch hub 108 to engage the clutch zone 106 in order to provide rotational motive power from the rotating jack shaft 44 to the sprocket 70 for turning drive wheel sprockets 72 and drive shafts 90 via drive chains 74.

The actuating means for controlling engagement of the clutch hub 108 to the clutch cone 106 comprises an actuating arm 120 having a hole 121 to which is attached a control linkage or rod 84. A pivot standoff 122 is provided about which the actuating arm may rotate and engage push plate 124. Rotation of actuating arm 120 about pivot 122 causes lateral movement of push plate 124 which causes disengage shaft 126 to rotate about pivot 128 thereby causing bearing arm 130 to move laterally in the opposite direction. Thus, as actuating arm 120 is moved in a longitudinal direction in response to the clutch control linkage or rod 84, the bearing arm 130 bears against hub collar 109 with force sufficient to compress spring 110 enough to cause the clutch hub 108 to move sufficiently laterally to disengage from cone 106. Clutch hub 108 has its inner surface advantageously coated with phenolic material to provide a hard engaging surface with respect to clutch cone 106.

For purposes of definition in this specification, spring assembly means includes pillow block 102, hub collar 109 to which sprocket 70 is attached, thrust bearing 111 connected to hub collar 109, and spring 102 held in compression between pillow block 203 and thrust bearing 111. Thus, there has been provided a clutch actuating arrangement whereby longitudinal movements of the linkage 84 created by engagement of lever 16 translates the longitudinal force into a latitudinal direction for directly disengaging the sprocket 70 from jack shaft 44.

FIG. 4A illustrates in a plan view the linkage 84 coupled to actuating arm 120 via hole 121, longitudal movement of linkage 84 causes the arm and plate 125 to rotate about pivot 122 and to bear against push plate 124 causing it to move laterally. Such lateral movement is translated to shaft 126 in hole 140.

The linkages 84 and 78 are advantageously arranged such that an initial actuation of control lever 16 not only simultaneously causes brake band 82 to engage brake drum 76 thereby braking drive shaft 90 and its drive wheel 12 but also simultaneously disengaging via clutch arrangement 45 the power from jack shaft 44 to sprocket 70. The linkage arrangements are such that after the wheel 12 has been braked, yet the control lever has not been returned to its complete rest or forward position, the clutch remains disengaged thereby disengaging power to wheel 12 even though the wheel is not braked. This feature of the invention will be described below in connection with the operation of the vehicle in describing its various modes of rotation.

Operation of the Vehicle

The vehicle according to the invention is operated by a person sitting in seat 22 and extending a foot to throttle control pedal 24 which, via linkage 86, controls the output power of gasoline engine 50. The vehicle is steered and braked via control levers 16 one for each of the latitudinal drive wheels 12. With no operation of the control levers 16, the vehicle is propelled via output shaft 56 and centrifugal clutch 58 which transmits rotative power to jack shaft 44. When the control levers 16 are not pulled, the clutch arrangement 45 transfers rotation power from jack shaft 44 to sprocket 70 and chain 74 to sprocket 72 for turning drive shafts 90 and drive wheels 12 in a forward direction.

In order to turn the vehicle the operator pulls the right hand control lever 16 in order to make a right turn or pulls the left hand control lever 16 to make a left turn. By pulling both levers, both wheels are simultaneously braked, and the motive power from jack shaft 44 is disengaged to the right and left drive shafts 90 via the clutch arrangements 45.

If a turn is desired, the lever corresponding to the direction of turn is pulled which simultaneously engages the brake band 82 about the brake drum 76 thereby braking the wheel on that side and the linkage 84 to the clutch arrangement 45 on that side disengages the power to that wheel. Thus, a turn or rotation about the braked wheel is accomplished. By continuing to brake that particular wheel, a 360° or more rotation occurs about that wheel providing a thrilling and entertaining ride for the operator.

If the operator releases the control lever 16 sufficiently to disengage the brake band 82 about drum 76 thereby causing the wheel 12 not to be braked, the clutch arrangement 45 continues to disengage the sprocket 70 from jack shaft 44 such that no power is transmitted to that wheel. In that instance rotation of the vehicle is about a vertical center line of the vehicle whereby the initial unbraked wheel will continue to rotate in an outer circle, yet the wheel 12 which was initially braked will begin to turn in a negative direction causing rotation about an axis approximately through the center of the vehicle. Thus, a second form of exciting ride is provided for the operator.

Thus, there has been provided a novel recreational vehicle which can provide an exciting ride to the operator with various modes controlled by the two side levers and throttle arrangement according to the invention.

It will be apparent to those skilled in the art that various changes may be made in the size, shape, type, number and arrangement of parts described hereinbefore without departing from the spirit of this invention and the scope of the appended claims. For example, a pulley and flexible belt may be substituted for the preferred sprocket and chain. An electric motor powered by a battery may be substituted for the gasoline engine preferred in this invention.

Having described the invention and the manner in which it may be used, what is claimed is:

1. A recreational vehicle for adapted for moving about a relatively flat surface comprising
   a frame,
   a pair of laterally spaced drive wheels mounted on the frame,
   a pair of longitudinally spaced wheels mounted on the frame, said pair of laterally spaced drive wheels and said pair of longitudinally spaced wheels mounted on the frame so that all wheels continuously engage said surface simultaneously,
   drive means mounted on the frame and individually coupled to each wheel of the pair of drive wheels for individually providing motive power to each wheel, and
   individual control means associated with each of said drive means and said drive wheels for
   (1) simultaneously braking a first drive wheel and de-coupling of said drive means to said first drive wheel, whereby if the other drive wheel is not braked and the other drive wheel is engaged with the drive means, the vehicle turns about the braked other drive wheel, and for
   (2) releasing the braking of the first drive wheel while maintaining the de-coupling of the drive means to said first drive wheel after first braking the first drive wheel and de-coupling the first drive means to said first drive wheel, whereby if the other drive wheel is not braked and the other drive wheel is engaged with the drive means, the vehicle spins about the center line of the vehicle.

2. The vehicle of claim 1 wherein said laterally spaced drive wheels are directly coupled to individual drive shafts, and said drive means includes power transfer means for individually providing rotation power to each shaft.

3. The vehicle of claim 2 wherein the power transfer means comprises,
a jack shaft mounted on the frame,
first and second jack shaft sprockets each one releasably coupled with the jack shaft,
first and second drive shaft sprockets, the first drive shaft sprocket connected to the first drive shaft, the second drive shaft sprocket connected to the second drive shaft, and
first and second drive chains, where the first drive chain is connected between the first jack shaft sprocket and the first drive shaft sprocket, and the second drive chain is connected between the second drive shaft sprocket and the second jack shaft sprocket.

4. The vehicle of claim 3 wherein said control means comprises,
first and second brake assembly means, one each attached to each drive shaft,
first and second clutch means, one each for coupling and decoupling the first and second jack shaft sprocket from said jack shaft,
first and second control levers, each mounted on the frame, the first control lever operatively connected to the first brake assembly means and to the first clutch means for coupling and decoupling the first jack shaft sprocket from the jack shaft,
the second control lever operatively connected to the other of said brake assembly means and to the other of the clutch means for coupling and decoupling the second jack shaft sprocket to the jack shaft for transmitting power between the jack shaft and the second drive shaft, wherein
first actuation of said first control lever means causes said first brake assembly means to brake said first wheel and causes said first clutch means to disengage said first jack shaft sprocket from the jack shaft, and
first actuation of said second control means causes said second brake assembly means to brake said second wheel and causes said second clutch means to disengage said second jack shaft sprocket from the jack shaft,
second actuation of said first control lever means causes the first brake assembly means to release the brake of said first wheel while said first clutch means continues to disengage said first jack shaft sprocket from the jack shaft, and
second actuation of said second control lever means causes the second brake assembly means to release the brake of said second wheel while said second clutch means continues to disengage said second jack shaft sprocket from the jack shaft.

5. The vehicle of claim 3 wherein said drive means includes a small horsepower gasoline engine having an output drive shaft and mounted on the frame and including a centrifugal clutch coupling the engine output drive shaft to said jack shaft.

6. The vehicle of claim 5 wherein each of said first and second brake assembly means comprises a drum attached respectively to each drive shaft and brake band means operatively disposed about said drum and connected via linkage means to the respective first and second control lever means.

7. The vehicle of claim 5 wherein each of said first and second clutch means comprises
a clutch cone connected to the jack shaft,
a clutch hub releasably engaging said clutch cone,
a jack shaft sprocket secured to said clutch hub,
a spring assembly for forcing said clutch hub into engagement with said clutch cone, and
actuating means responsive to its respective control lever means for causing said spring assembly means to cease urging said clutch hub into engagement with said clutch cone whereby said jack shaft sprocket assembly is rotatably coupled to said jack shaft when said clutch hub engages said clutch cone and said jack shaft sprocket assembly is decoupled from said jack shaft when said clutch cone is disengaged from said clutch hub.

8. The vehicle of claim 7 wherein
said clutch hub, sprocket assembly and said spring assembly fit about said rotatable jack shaft on bushings, said spring assembly comprising
a pillow block fixed with respect to the frame of the vehicle,
a hub collar connected to said sprocket assembly, said hub collar having a bearing surface for engagement with said actuating means,
a thrust bearing connected to said hub collar, and
a spring held in compression between said thrust bearing and said pillow block, whereby until the hub collar causes further compression of said spring because of engagement of said actuating means, said spring urges said clutch hub into engagement with said clutch cone by transmission of its compression force via the thrust bearing, hub collar and sprocket.

9. The vehicle of claim 8 wherein said actuating means comprises
an actuating arm having a hole therein for accepting a clutch linkage attached to said control lever means, said actuating arm being rotatable about a pivot standoff through said arm in response to longitudinal movement of said linkage,
a push plate mounted for lateral movement by abutting engagement with said actuating arm, said push plate moving laterally as said actuating arm pivots about said pivot point in response to longitudinal movement of said linkage,
a disengage shaft fixed about a pivot point and having one end engaged in a hole in said push plate, and having a second end for engagement against said hub collar of said spring assembly, whereby
said movement of said push plate in one direction is translated into movement in the opposite direction against said hub collar for disengaging said sprocket assembly from said jack shaft means, and
where no movement of said push plate is caused by said linkage and actuating arm, engagement of said disengagement shaft against said hub collar is prevented and the engagement of said sprocket assembly with said jack shaft is maintained.

10. The vehicle of claim 4 wherein
said control means includes brake llinkage means and clutch linkage means wherein said brake linkage means and said clutch linkage means are cooperatively arranged for (a) simultaneous braking and disengaging of the coupling of said drive means to said drive wheel when said control lever is pulled relatively strongly, (b) no braking but disengaging of the coupling of said drive means to said drive wheel when said control lever is pulled relatively slightly, and (c) no braking and engagement of the coupling of said drive means to said drive wheel when said control lever is not pulled whereby that wheel is not braked and engagement of that wheel is made with the jack shaft, where simultaneous braking of the other wheel and disengagement of the coupling of said drive means to the other wheel causes the vehicle to rotate about that other wheel, no braking of the other wheel but disengagement of the coupling of said drive means to said drive wheel of the other wheel causes the vehicle to rotate about an axis approximately through the center of the vehicle, and no braking of the other wheel and engagement of the coupling of said drive means to said other drive wheel causes the vehicle to travel substantially in a straight line.

11. A recreational vehicle comprising a frame, a pair of laterally spaced drive wheels mounted on the frame, a pair of longitudinally spaced wheels mounted on the frame, drive means mounted on the frame and individually coupled to each wheel of the pair of drive wheels for individually providing motive power to each wheel, and control means for individually and simultaneously braking and disengaging the coupling of said drive means to each wheel of the pair of drive wheels, wherein said pair of longitudinally spaced wheels are each a set of two small diameter wheels mounted for 360° rotation with respect to the frame.

12. A recreational vehicle comprising a frame, a pair of laterally spaced drive wheels mounted on the frame, a pair of longitudinally spaced wheel means mounted on the frame, drive means mounted on the frame and individually coupled to each wheel of the pair of drive wheels for individually providing motive power to each wheel, and control means for individually and simultaneously braking and disengaging the coupling of said drive means to each wheel of the pair of drive wheels, the drive means including:

a jack shaft mounted on the frame, a small horsepower gasoline engine mounted on the frame having an output drive shaft and including a centrifugal clutch coupling the engine output drive shaft to the jack shaft, first and second jack shaft sprockets each one releasably coupled with the jack shaft, first and second drive shaft sprockets, the first drive shaft sprocket connected to the first drive shaft, the second drive shaft connected to the second drive shaft, and first and second drive chains, the first drive chain connected between the first drive shaft sprocket and first jack shaft sprocket, the second drive chain connected between the second drive shaft sprocket and the second jack shaft sprocket, said control means including:

first and second brake assembly means, one each attached to each drive shaft, first and second clutch means, one each for coupling and decoupling the first and second jack shaft sprocket assembly from said jack shaft, first and second control levers each mounted on the frame, the first control lever operatively connected to the first brake assembly means and to the first clutch means by a first brake linkage means and a first clutch linkage means for coupling and decoupling the first jack shaft sprocket to and from the jack shaft, the second control lever operatively connected to the second brake assembly means and to the second clutch means by a second brake linkage means and a second clutch linkage means for coupling and decoupling the second jack shaft sprocket to and from the jack shaft, the first brake linkage means and first clutch linkage means operatively arranged, when relatively strongly pulled by said first control lever, for braking said first wheel and disengaging said first jack shaft sprocket from the jack shaft causing the vehicle to turn about the braked first lateral wheel, and after braking, when pulled relatively lightly, for releasing the brake while maintaining the disengaging of the first jack shaft sprocket from the jack shaft, causing the vehicle to spin about the center line of the vehicle, and when not pulled, for engaging the first jack shaft sprocket with the jack shaft causing the vehicle to move in a straight line, the second brake linkage means and second clutch linkage means operatively arranged, when relatively strongly pulled by said second control lever, for braking said second wheel and disengaging said second jack shaft sprocket from the jack shaft causing the vehicle to turn about the braked second lateral wheel, and after braking, when pulled relatively lightly, for releasing the brake while maintaining the disengaging of the second jack shaft sprocket from the jack shaft causing the vehicle to spin about the center line of the vehicle, and when not pulled, for engaging the second jack shaft sprocket with the jack shaft causing the vehicle to move in a straight line.

* * * * *